June 8, 1943.  F. J. PEPERSACK  2,321,417
FITTING CONSTRUCTION FOR TANKS
Filed Dec. 19, 1941  2 Sheets-Sheet 1
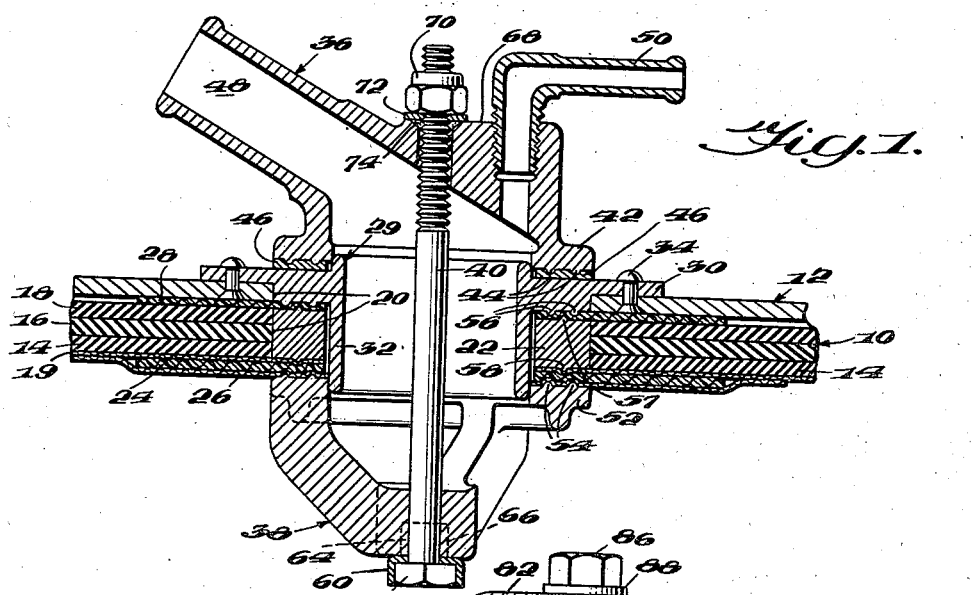
Inventor
FRANCIS J. PEPERSACK,
By George Douglas Jones
Attorney June 8, 1943.    F. J. PEPERSACK    2,321,417
FITTING CONSTRUCTION FOR TANKS
Filed Dec. 19, 1941    2 Sheets-Sheet 2
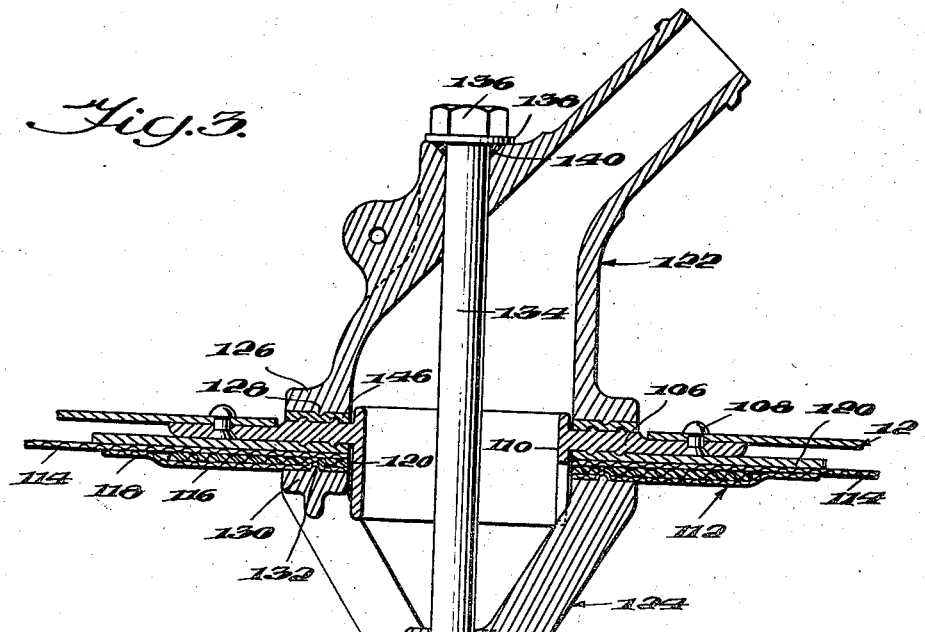
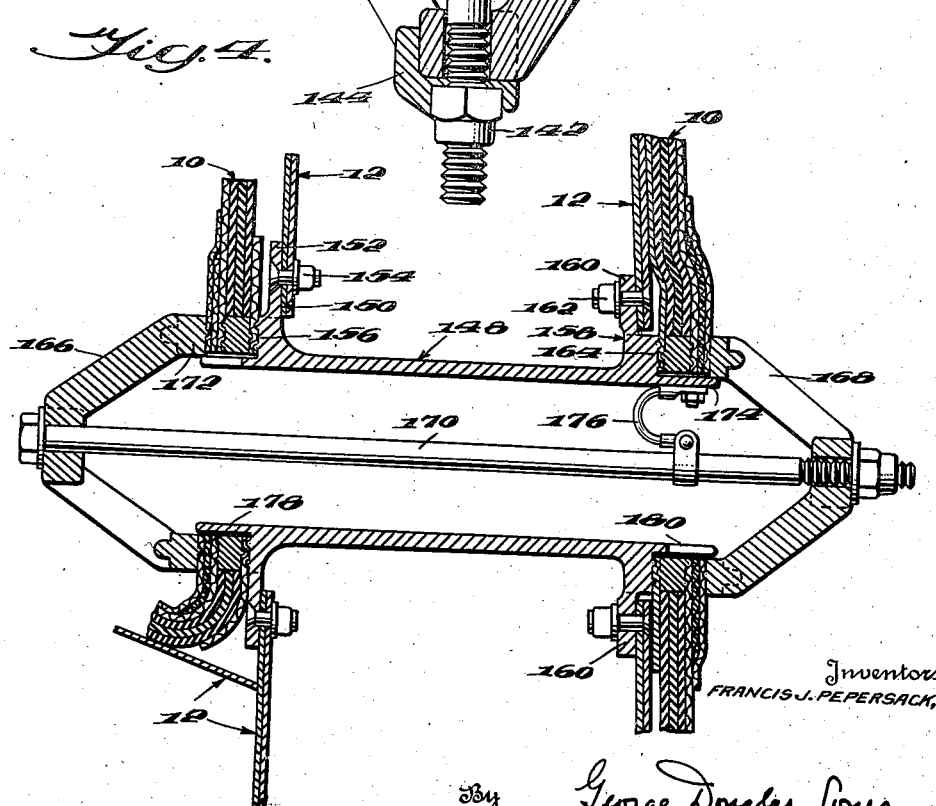
Inventors
FRANCIS J. PEPERSACK,
By George Douglas Jones
Attorney Patented June 8, 1943

2,321,417

UNITED STATES PATENT OFFICE 2,321,417

FITTING CONSTRUCTION FOR TANKS

Francis J. Pepersack, Towson, Md., assignor to The Glenn L. Martin Company, Middle River, Md., a corporation of Maryland Application December 19, 1941, Serial No. 423,646

7 Claims. (Cl. 285—96.9)

This invention relates to a fitting construction for tanks and particularly for tanks adapted to contain liquid fuel and comprising a cell within a rigid housing structure. Such tanks find application as fuel and oil tanks for airplanes and are adapted to be fitted into the different parts of an aircraft fuselage or wing so that the normal structure provides the rigid confining element of the tank. For an example of this practice, reference may be had to Gray et al. Patent No. 2,102,590 disclosing a cellular form of tank applied to aircraft construction.

Of course the cellular form of tank in question is readily adaptable to other kinds of transport vehicles and especially to ships.

It is intended primarily to provide an improved fitting for access to the cell part of the tank and which will be so constructed as to produce a leakproof connection and afford support for the cell part of the tank which is too flexible to be self-sustaining.

It is a further object of the fitting of this invention to provide reinforcing for the cut opening in the rigid structure or cell housing. This means for reinforcing is also constructed and arranged to assist in aligning the corresponding opening in the cell element.

Since for their bullet-proof and generally impervious qualities the enclosed cell elements of such tanks are usually composed of rubber-like material, it is essential to prevent the deleterious results of cold flow which would ordinarily take place when the cell material around an opening is subjected to continuous and heavy clamping pressure by a fitting. To meet this aspect of the problem, rigid means have been provided for protecting the rubber-like material defining the cell opening from the clamping pressure, and sealing layers have been added to give the required fluid tightness.

One of the advantages of the novel construction which will be pointed out in detail resides in the provision of a single detachable means for establishing the required clamping relation of the rigid fitting, the rigid structure, and the cell element.

A special object of the invention is to provide a tank fitting construction of the type generally described in which a single fitting is formed to provide a fluid conduit between two such tanks and a leak-proof connection with the opening of each.

Other features of novelty contributing to the effectiveness and simplicity of the tank construction of this invention will be pointed out in connection with the following detailed description of several embodiments taken in connection with the accompanying drawings, in which Fig. 1 shows, in vertical section, one form of fitting clamped to a rigid structure and a cellular tank element;

Fig. 2 is a similar vertical section of a further embodiment of the fitting and tank construction;

Fig. 3 illustrates, by way of vertical section, a somewhat different form of fitting and modification of the cell element of the tank; and Fig. 4 is a vertical section showing a form of fitting employed to interconnect and support two such tank constructions.

In Fig. 1, a highly flexible or pliant cell 10 of rubber-like material is housed in a rigid frame structure 12. The cell 10 is of the self-sealing variety and includes an inner layer 14, an intermediate sealant layer 16, and an outer layer 18, comprising a three-ply lamination subject to cold flow under pressure. In particular, the inner layer 14 will preferably be of a synthetic rubber known commercially as Neoprene, because of its resistance to attack by liquid hydrocarbon fuels. Crude unvulcanized rubber is used for the intermediate layer 16 in order to provide a sealing action and prevent leakage following bullet penetration. The outer layer 18 which contacts the housing structure 12 is by preference formed of soft vulcanized rubber. It is to be further noted that an inner reinforcing layer or lining 19 covers the liquid side of the cell and that this member may be of fabric impregnated with Neoprene. These three layers and the inner reinforcing lining 19 are adhesively bonded after suitable surface treatment to improve the grip of the adhesive. This bullet-proof cell construction comprises the subject-matter of Gray and DeWeese patent application Serial No. 338,052, filed May 31, 1940, entitled "Self-sealing tank."

An opening 20 is shown extending uniformly through the metallic frame structure 12 and the three rubber-like layers of the cell 10. A rigid ring or tubing 22 is closely fitted within the portion of the opening 20 defined by cell layers 14, 16 and 18 and has the total thickness of these layers in unstressed condition. The ring 22 is preferably formed from a phenolic condensate material such as Bakelite, or from molded fibre, and has important functions which will be described subsequently. Particular note is made of the fact that the reinforcing fabric layer 19 extends inwardly of the opening 20 and covers the lower face of the molded ring 22. In like manner, an inner reinforcing member 24 of washer shape and comprising a heavy fabric impregnated with Neoprene surrounds the opening 20 and overlaps it to cover the inner face of the rigid ring 22. A fabric seam cover 26 of balloon cloth treated with neoprene entirely covers the inner reinforcing member 24. Both the reinforcing member 24 and its seam cover 26 are adhesively secured in place by a suitable cement. The seal of the non-resilient ring 22 within the wall opening of cell 10 is completed by an outer, heavy fabric reinforcing member 28 of circular shape extending over the uppermost face of ring 22, and adhesively attached to it and the adjacent flush surface of cell 10. Reinforcing member 28 is similar to member 24.

On the outer side of the stiff confining structure 12 a generally tubular adapter 29 comprising an outwardly extending, shouldered flange 30 and an integral sleeve 32 is fitted within the opening 20 and secured to the outer side of structure 12 by means such as rivets 34. The flange 30 reinforces the structure 12 around its opening 20 and provides a bearing abutment for the ring 22 and its sealing cover members. It will be observed that the integral sleeve 32 of the flanged adapter 29 extends continuously above and below its lateral flange portion 30.

An opposed pair of rigid outer and inner clamping members 36 and 38, respectively, are so formed as to provide a continuous passageway with the intermediate sleeve 32. These clamping members may take a variety of forms. As illustrated in Fig. 1, the outer clamping member 36 is represented as an elbow or L, and the inner clamping member 38 is of spider form. A single, detachable clamping means in the form of a bolt 40 extends through the adapter sleeve 32 and engages the two clamping members 36 and 38. The outer clamping member 36 is formed with a circular flange 42 having a spaced pair of ridges 44 on its inner face for engaging a suitable sealing gasket 46 resting upon the outer side of the shouldered flange 30. The clamping member flange 42 is of approximately the same width as the adjacent face of rigid ring 22 and snugly engages the outer wall of the sleeve 32.

The elbow fitting or clamping member 36 has a large passage 48 and a smaller passage including a threadedly attached elbow 50.

The inner clamping member 38 is formed to provide a circular clamping face 52 sliding over the inner end of adapter sleeve 32 and having a pair of spaced ridges 54 engages the portion of the seam cover 26 and outer reinforcing member 28 covering the underside of the rigid ring member 22. In this connection, it will be observed that the inner face of flange 30 which is flush with the corresponding face of the rigid metal structure 12, has a similar and opposed pair of spaced ridges 56 which clamp against the outer reinforcing member 28. In staggered relation to these opposed pairs of ridges, the intervening annulus or ring 22 has single upper and lower ridges 57 and 58.

Since the bolt 40 is accessible only outside of the tank after assembly of the clamping members, a retaining clip 60 is provided for engaging head 62 of the bolt, and by means of a shank 64 keyed within a counterbore 66 of the inner clamping member 38, prevents turning of the head 62 when an exterior nut 70 on the other bolt end is tightened against a washer 72 covering a countersunk, liquid sealing washer 74 of neoprene. A hand hole also is provided in the cell to give convenient access.

In assembling the tank and fitting of the Fig. 1 embodiment, the adapter 29 will be secured to structure 12 so that the inwardly extending end of its sleeve 32 will serve as a pilot guide for the cell opening defined by the rigid ring 22. It remains then only to place the exterior gasket 46 and the outer clamping member 36 over the upper end of sleeve 32, slide the inside spider-like clamping member 36 over sleeve 32, and tighten the stop nut 70 on the outer end of the bolt 40. Suitable peripheral sealing will be accomplished by the clamping of rubber impregnated inner and outer reinforcing members 24 and 28 against the noncompressible ring 22, thus leaving the three adjacent rubber-like layers 14, 16 and 18 comprising the body of the cell free from compression.

In the easily and quickly installed construction which has been described, the non-resilient ring 22 prevents cold flow of the clamped flexible cell material and provides a rigid opening in the wall of the otherwise highly flexible cell. It is also particularly noteworthy that the shouldered flange 30 of the adapter ring acts as a reinforcing member for the cut open in the cell housing or airplane structure 12, thus avoiding sealing of this structure plus a reinforcing; and that the projecting sleeve 32 serves as a guide for the installation of the cell 10 and has a bearing for rigid ring 22 to prevent shifting of the cell. The adapter sleeve 32 likewise serves as a contact surface for the outer clamping member or fitting 36. Assembly is greatly facilitated by having only a single clamping bolt with an outwardly exposed nut to press all of the members into their required relation.

The embodiment of the invention illustrated by the hull tank outlet and filler of Fig. 2 closely resembles that which has been described in detail with reference to Fig. 1. The construction of the cell 10 and rigid housing structure 12 are the same, but it will be noted that the outer and inner clamping members 76 and 78, respectively, both are in the form of elbow or L fittings. As in the first embodiment, a single bolt 80 passing through the common opening is all that is required to hold the assembly clamped together. The outer clamping member 76 has a face 82 which is parallel to a similar opposite face 84 on the inner clamping member 78, and provides an abutment surface for the bolt head 86, its washer 88 and countersunk neoprene sealing washer 74. The inner end of the bolt 80 has an elastic stop nut 90 secured by a somewhat modified form of nut clip 92 fitted on face 84 in non-turning relation.

A non-resilient, Bakelite or fibre, ring 94, practically identical with the same element in Fig. 1, has a pair of ridges 95, 95, on its inner face and an intermediate ridge 96 on its outer face, for engaging respectively the inner and outer cell opening reinforcing members.

The outer clamping member 76 is formed with a circular flange 98 having a single clamping ridge 100 bearing against the gasket 46. In this embodiment, the tubular adapter has its shouldered flange 106 secured to the inner surface of the rigid housing structure 12 by means such as rivets 108 and has an integral, opening-defining sleeve 110 similar to that previously described. If desired, the outer face of flange 106 may also be provided with a spaced pair of ridges 111 for gripping the gasket 46. The assembly and the use of this outlet and filler fitting for a self-sealing cell will be apparent from the description of the embodiment of Fig. 1.

Fig. 3 illustrates the application of the principles of this invention to a vent for a wing tank and its adaptation to a different cell construction not requiring the rigid ring of the two previous embodiments.

A rigid structure 12 houses a pliant cell 112 composed of a relatively thin wall layer 114 of synthetic rubber or neoprene and reinforced about the vent opening by an inner reinforcement layer 116 resembling a large washer and preferably formed from a heavy fabric impregnated with neoprene. As in the other cell construction, this reinforcement member 116 has its seam covered and inner surface sealed by a layer 118 preferably of balloon cloth fabric impregnated with neoprene and adhesively attached. Where neoprene is mentioned as one of the materials comprising the cell, it is to be understood that other suitable pliable substances which are resistant to the action of hydrocarbons may be used. An outer reinforcing member 120 similar in all respects to the inner member 116 but of somewhat larger outside diameter is adhesively secured to the cell wall 114 and completes the reinforcement of its opening.

Similar reference numerals have been used for parts identical with those previously described in detail. Thus, the tubular adapter having housing reinforcing flange 106 and sleeve 110 is the same as for the embodiment of Fig. 2. In this particular fitting, the upper clamping member 122 comprises an L and the lower clamping member 124 is of the previously used spider form. The upper clamping member 122 has a transverse flange 126 with a ridge 128 on the face where it engages gasket 46. The spider-like lower clamping member 124 is provided with a circular flange 130 with a single ridge 132 on the face abutting the similar cover layer 116. In common with all illustrated forms of the invention, a single bolt 134 is used to maintain the required clamping relation. This bolt has an outer head 136 engaging a washer 138 overlying a countersunk neoprene sealed washer 140. A stop nut on the inside end of the bolt 134 is held against turning by a clip 144 fitted on the innermost end of the clamping member 124.

While this embodiment is independent of the rigid ring for preventing compression of the cell material, attention is called to the fact that it possesses all of the advantages and utility which the combined flange and sleeve adapter and single separable clamping means afford.

A further useful form of the present invention is illustrated in Fig. 4 as an interconnector for an adjacent pair of tank cells. In this instance, a pair of tanks are arranged to have the approximately parallel, spaced portions indicated by the drawings, and each comprises a cell 10 and confining, rigid structure 12, as described in detail for Fig. 1. The aligned pair of openings for each tank are also in alignment with each other. A particular feature of this embodiment is a double-ended adapter 148 spacing and providing communication between the interiors of the adjacent tanks.

An integral, shouldered flange 150 at the left end of this sleeve adapter has an outer portion 152 underlying the housing structure 12 and secured thereto by bolt means 154. The shouldered flange 150 includes also an inwardly projecting and ridged clamping face 156 bearing against the adjacent surface of the cell 10. A similar shouldered flange 158 at the other end of the tubular adapted 148 has an opposed pair of ear portions 160 for receiving the small attaching bolt means 162 and reinforcing the outer surface of the underlying housing structure 12 around its opening. An inwardly faced ridged clamping flange 164 engages the outer surface of the clamped portion of the other cell 10.

A spider form of clamping member 166 within the left end cell 10 cooperates with the clamping flange 156. At the right end an identical clamping member 168 is disposed in cooperative relation with the clamping flange 164 and the intervening portion of cell 10. A long bolt 170 extends centrally through the adapter 148 and through the inner clamping members 166 and 168 so as to draw the assembly into the required clamping relation.

A ridged clamping flange 172 on the member 166 and an identical clamping flange 174 on the opposite member 168 are of such internal diameter as to fit over short inward sleeve extensions 178 and 180 at the respective ends of the adapter 148. These extensions 178 and 180 may be slotted as shown to clear the clamping members when used with a thinner cell. To ground the bolt 170 and its metallic clamping parts, a bonding jumper 176 interconnects the bolt with the adjacent inward ring extension 180.

The use of a common double-ended, tubular adapter 148 between two tanks permits the elimination of two separate clamping members for the outer side of these tanks and the securing of two apertured cell portions in supporting relation to their housing structures by means of a single bolt or the like.

Those versed in this art will appreciate that the non-resilient ring in combination with the opening of a tank cell and the reinforcing members for sealing the ring around the opening will have utility in other relations where it is necessary and desirable to prevent cold flow deformation of the rubber-like material adjacent the opening.

The term "ring" as used in the specification and the appended claims is intended to mean any form of continuous or annulus member, be it round, rectangular or other shape, as dictated by the dimensions of the space available and the nature of the fitting to be used for the clamping. Likewise, it will be observed that the principles of this invention disclosed herein are applicable to a cell and housing structure opening receiving other forms of fittings, for example, a valve, merely an attaching device for supporting the cell in the structure, or an access door which may be completely removed to gain entrance to the inside of the cell.

It will be clear from the embodiments of the invention which have been presented that numerous changes may be made in the details of construction and arrangements of the tank and fitting parts without departing from the spirit of the invention and the scope of the appended claims.

Having thus described the invention, what is new and desired to be secured by Letters Patent of the United States is:

1. In combination with a liquid fuel or lubricant tank cell comprising one or more layers of rubber-like material subject to cold flow and having an opening through the wall thereof, a ring of rigid material having approximately the unstressed thickness of the cell material subject to cold flow and closely fitted within the opening therethrough; flexible reinforcement layers secured to the inner and outer sides of the cell and overlapping the corresponding faces of the ring; and rigid means arranged in clamping relation to opposite sides of the cell wall about its opening and effective only within the face areas of the ring.

2. In combination with a liquid fuel or lubricant tank cell comprising one or more layers of rubber-like material subject to cold flow and having an opening through the wall thereof, a non-resilient annulus member having approximately the unstressed thickness of the cell material subject to cold flow and closely fitted within the opening therethrough; flexible reinforcement layers secured to the inner and outer sides of the cell and overlapping the corresponding faces of the annulus member; and passaged means arranged in clamping relation to opposite sides of the cell wall and effective only within the face areas of the annulus member.

3. In combination with a liquid fuel or lubricant tank cell comprising one or more layers of rubber-like material subject to cold flow and having an opening through the wall thereof, a relatively undeformable ring having approximately the unstressed thickness of the cell material subject to cold flow and closely fitted within the cell opening; flexible means secured to the inner and outer sides of the cell and overlapping the corresponding faces of the ring for sealing the juncture between the tank cell and the ring; and means arranged in clamping relation to opposite sides of the cell wall and effective within the face areas of the ring.

4. The combination with a spaced pair of flexible rubber-like cells each provided with an opening in its wall and confined by a rigid structure formed with an opening concentric with the cell opening, the openings of both cells being aligned, of a continuous tubular adapter extending between the two cells and structures having at each end an outwardly extending flange joined to a sleeve portion extending inwardly through the openings in said cells and said rigid structures, said adapter flanges each being secured to one of the rigid structures about its opening; a passaged clamping member within each cell encircling the corresponding end of the adapter sleeve, said adapter flanges and clamping members being constructed and arranged to receive the marginal portion of the cell wall adjacent its opening therebetween; and separable means for imposing clamping pressure on said marginal portions of the cell walls through the adapter flanges and the clamping members.

5. As a subcombination, a liquid fuel or lubricant tank including a highly flexible container cell comprising one or more layers of material subject to cold flow under compression, said container cell being provided with an opening through its wall; a non-resilient ring having approximately the total thickness of said cell material in uncompressed condition fitted within the opening of said cell; and sealing layers adhesively secured to the inner and outer sides of the container cell about its opening and formed and arranged to cover the abutment lines between said ring and said cell.

6. As a subcombination, a liquid fuel or lubricant tank including a highly flexible container cell comprising one or more layers of material subject to cold flow under compression, said container cell being provided with an opening through its wall; a non-resilient ring having approximately the total thickness of said cell material in uncompressed condition fitted within the opening of said cell; sealing layers adhesively secured to the inner and outer sides of the container cell about its opening and formed and arranged to cover the abutment lines between said ring and said cell; and means for clamping the portion of the container cell adjacent said ring to a rigid confining structure, said clamping means being adapted to act only on said ring so as not to compress the wall of the container cell.

7. Means for attaching a flexible cell of rubber-like material to a rigid confining structure and defining a continuous opening through the wall of said cell and said structure, comprising a tubular adapter having a sleeve portion for extending through and aligning the openings of said cell and said confining structure, said adapter having also a flange intermediate its length formed and arranged to be secured around the opening of said confining structure; and an opposed pair of passaged clamping members for acting upon the flange of the adapter ring and the cell material around its opening to attach the cell to the confining structure and peripherally seal both sides of the cell wall at its opening.

FRANCIS J. PEPERSACK.